(12) United States Patent
Childress et al.

(10) Patent No.: US 7,487,239 B2
(45) Date of Patent: Feb. 3, 2009

(54) COMPOSITE RESOURCE MODELS

(75) Inventors: Rhonda L. Childress, Austin, TX (US);
David Bruce Kumhyr, Austin, TX (US);
Neil Raymond Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 10/809,587

(22) Filed: Mar. 25, 2004

(65) Prior Publication Data

US 2005/0223299 A1      Oct. 6, 2005

(51) Int. Cl.
*G06F 15/173*      (2006.01)
(52) U.S. Cl. .............. 709/224; 709/217; 709/220; 709/223; 709/226
(58) Field of Classification Search ........... 709/217, 709/220, 223, 224, 226
See application file for complete search history.

(56) References Cited

U.S. PATENT DOCUMENTS

| | | | | |
|---|---|---|---|---|
| 6,970,927 B1* | 11/2005 | Stewart et al. | ............. | 709/225 |
| 6,980,515 B1* | 12/2005 | Schunk et al. | ........... | 370/230.1 |
| 7,116,679 B1* | 10/2006 | Ghahremani | ............... | 370/463 |
| 7,143,187 B1* | 11/2006 | Takeda et al. | ............... | 709/245 |
| 7,193,996 B2* | 3/2007 | Dobbins et al. | ............ | 370/392 |
| 2001/0039585 A1* | 11/2001 | Primak et al. | .............. | 709/228 |
| 2002/0083163 A1 | 6/2002 | Collazo | | |
| 2004/0116141 A1* | 6/2004 | Loven et al. | ................ | 455/519 |
| 2004/0122871 A1* | 6/2004 | Hansen et al. | ............. | 707/204 |
| 2004/0133690 A1* | 7/2004 | Chauffour et al. | ........... | 709/229 |
| 2005/0154861 A1* | 7/2005 | Arimilli et al. | .............. | 712/216 |
| 2005/0160424 A1* | 7/2005 | Broussard et al. | ............. | 718/1 |
| 2006/0135158 A1* | 6/2006 | Lee et al. | ................. | 455/435.1 |

OTHER PUBLICATIONS

Augerat et al., "Scalable monitoring and configuration tools for grids and clusters", Parallel, Distributed and Network-Based Processing, 2002. Proceedings of the 10th Euromicro Workshop Jan. 2002, IEEE Comput. Soc., US, 2002, pp. 147-153.

Anderson et al., "Extensible, Scalable Monitoring for Clusters of Computers", Proceedings of the Eleventh Systems Administration Conference, Oct. 1997, pp. 9-16.

(Continued)

*Primary Examiner*—Liangche A Wang
(74) *Attorney, Agent, or Firm*—Duke W. Yee; Jeffrey S. LaBaw; Wayne P. Bailey (57) ABSTRACT

A mechanism and model are provided for representing and managing composite resource models. When a resource monitor is deployed for a resource, the resource monitor scans for information that indicates that the resource under monitoring is part of a cluster, grid, or other composite configuration. The resource monitor then determines whether monitoring information for the resource should be reported differently because of the composite configuration. If monitoring information for the resource is to be reported differently, the resource monitor alters the reporting format to reflect the composite resource model. The resource manager may then receive the monitoring information and apply this information to individual resources and aggregates the monitoring information for composite resources.

15 Claims, 5 Drawing Sheets

OTHER PUBLICATIONS

Zhengyu et al., "ClusterProbe: an Open, Flexible and Scalable Cluster Monitoring Tool", IEEE Computer Society International Workshop on Cluster Computing, Dec. 1999, pp. 1-8.

Buyya, "PARMON: A Portable and Scalable Monitoring System for Clusters", Software Practice & Experience, John Wiley & Sons Ltd., Chichester, GB, vol. 30, No. 7, Jun. 2000, pp. 723-739.

Haynes et al., "A Visualization Tool for Analyzing Cluster Performance Data", Proceedings of 2001 IEEE International Conference on Cluster Computer, Newport Beach, CA, pp. 295-302.

* cited by examiner

COMPOSITE RESOURCE MODELS

BACKGROUND OF THE INVENTION

1. Technical Field

The present invention relates to data processing systems and, in particular, to monitoring resources in a network data processing system. Still more particularly, the present invention provides a method, apparatus, and program for modeling composite resources in a network data processing system.

2. Description of Related Art

The process of provisioning resources can be very complex and may vary in many different aspects. The provisioning processes for each resource type may be different. Monitors are resources that provide information about other resources. For example, a monitor may be used to determine whether a switch is functional. A server may use a monitor to determine whether server resources are exhausted. Metering monitors are deployed on resources such that billing systems may use the monitored data created and collected.

Resource models provide good monitoring capability and metrics on systems and applications. However, resource models are based upon an assumption that the monitor is operating on a discrete and separate system. Computers are often aggregated into clusters or grids. Clustering refers to using two or more computer systems that work together. The term "cluster" generally refers to multiple servers that are linked together in order to handle variable workloads or to provide continued operation in the event one fails.

Individual computers, as well as clusters of computers, may belong to a grid. In fact, grids are often thought of as clusters of clusters. Grid computing is the sharing of central processing unit (CPU) resources across a network so that a plurality of machines function as one large supercomputer. Grid computing, also referred to as peer-to-peer computing or distributed computing, allows unused CPU capacity in any of the machines to be allocated to the total processing job required.

In a large enterprise, hundreds or thousands of desktop machines may be sitting idle at any given moment. A CPU may be considered idle even when a user is reading the screen and not interacting with the machine. Other computing resources may be idle at various times of the day. For instance, a cluster of database servers, or a subset thereof, may be unused during non-business hours, for example during the middle of the night. Case in point, during peek business hours in New York City, most people are likely to be asleep in India. Therefore, at any time of the day there may be unused processing cycles that could be put to use on large computational problems.

When resources, such as computers or applications, are aggregated into clusters or grids, the nature of the information that is reported by resource monitors may be interpreted in a different manner, because the resource being monitored is now part of a cooperative environment and need to be treated as such. For example, suppose a processor fails in a multiprocessing system with four processors and that multiprocessing system is one of four servers in a cluster, wherein each server is a multiprocessing system with four processors. When the failure of the processor is reported by the resource monitor, the meaning of this information is very different when considered with respect to the cluster rather than the individual server. For an individual computer, the processor failure represents a failure of one fourth of the CPU resources; however, for the cluster, the processor failure represents a failure of only one sixteenth of the CPU resources.

SUMMARY OF THE INVENTION

The present invention recognizes the disadvantages of the prior art and provides a mechanism and model for representing and managing composite resource models. When a resource monitor is deployed for a resource, the resource monitor scans for information that indicates that the resource under monitoring is part of a cluster, grid, or other composite configuration. The resource monitor then determines whether monitoring information for the resource should be reported differently because of the composite configuration. If monitoring information for the resource is to be reported differently, the resource monitor alters the reporting format to reflect the composite resource model. The resource manager may then receive the monitoring information and apply this information to individual resources and aggregate the monitoring information for composite resources.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
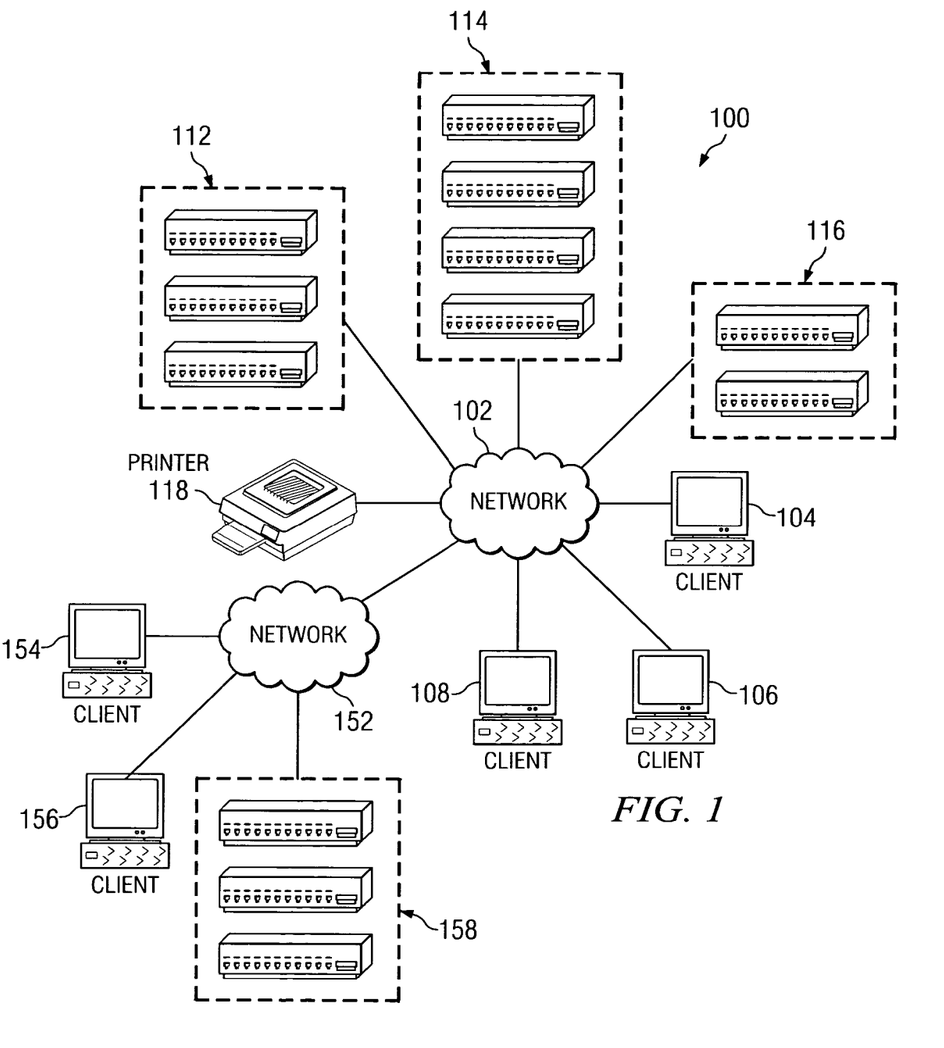
FIG. 1 depicts a pictorial representation of a network of data processing systems in which exemplary aspects of the present invention may be implemented.
Figure 2:
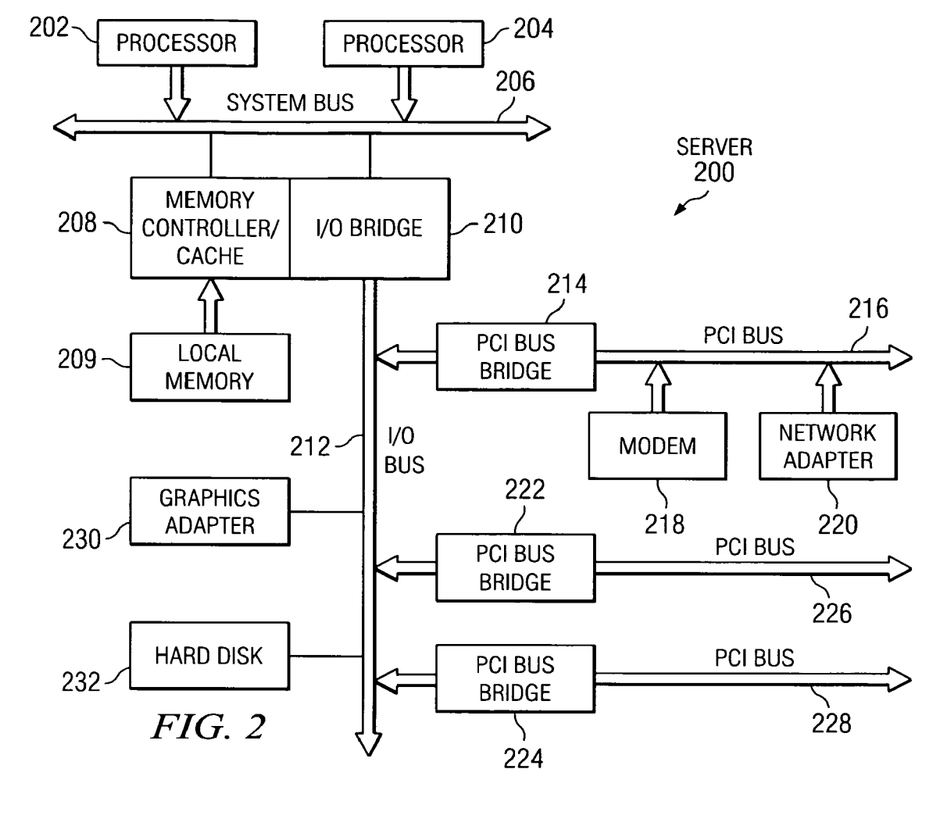
FIG. 2 is a block diagram of a data processing system that may be implemented as a server in accordance with an exemplary embodiment of the present invention.
Figure 3:
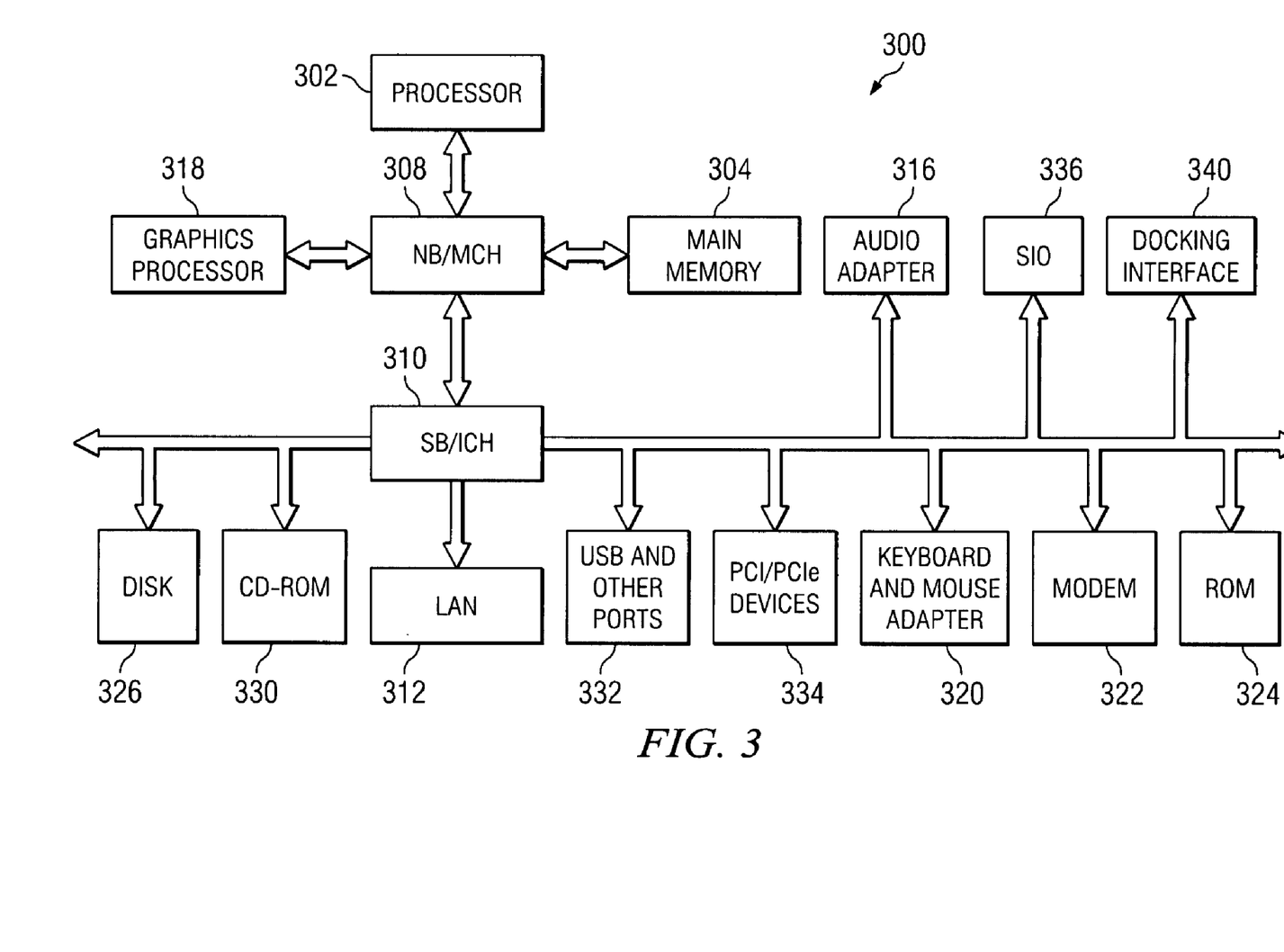
FIG. 3 is a block diagram of a data processing system in which exemplary aspects of the present invention may be implemented.

The present invention provides a method, apparatus and computer program product for mutual authorization of a secondary resource in a grid of resource computers. The data processing device may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which exemplary aspects of the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers and other computing devices are connected to network 102. In addition, clients 104, 106, and 108 are connected to network 102. These clients 104, 106, and 108 may be, for example, personal computers or network computers. An enterprise may have many computing devices connected to a network. For example, servers 112 may provide a first service, while servers 114 provide a second service and servers 116 provide a third service. For example, servers 112 may be accounting servers, servers 114 may be Web servers, and servers 116 may be database servers. In the depicted example, servers 112, 114, 116 provide data, services, or applications to clients 104, 106, 108. Printer 118 may be provided for use by particular devices in the network data processing system. For example, printer 118 may be assigned a role of printing billing statements for billing servers, providing printed output for particular clients in the network, or generating dump records for program development.

The groups of servers 112, 114, 116 may be referred to as composite configurations, that may include clusters and grids, for example. Clustering refers to using two or more computer systems that work together. The term "cluster" generally refers to multiple servers that are linked together in order to handle variable workloads or to provide continued operation in the event one fails. Resources within a cluster are managed using cluster software that provides load balancing and failover operations for fault tolerance. The number of resources, such as servers, in a cluster may vary depending upon the application or implementation.

Similarly, servers and other computing devices are connected to network 152 that is connected to network 102. Clients 154, 156 are connected to network 152. These clients 154, 156 may be, for example, personal computers or network computers. Servers 158 may provide a particular service to clients 154, 156. For example, servers 158 may perform computation-intensive tasks, such as medical imaging. In the depicted example, servers 152 provide data, services, or applications to clients 154, 156. Network data processing system 100 may include additional servers, clients, and other devices not shown.

Furthermore, various resources in network data processing system 100 may be part of a grid of computing systems. Grid computing is the sharing of central processing unit (CPU) resources across a network so that a plurality of machines function as one large supercomputer. Grid computing, also referred to as peer-to-peer computing or distributed computing, allows unused CPU capacity in any of the machines to be allocated to the total processing job required.

A grid may be made up of a combination of client and server computers and clusters of computers. In fact grids are often referred to as clusters of clusters. Any computer system with unused resources may be configured to accept grid jobs through network data processing system 100. The grid computers within the grid may span the world and may be connected to network 102 through, for example without limitation, private networks, dial-up connections, dedicated Internet connections, gateway services, etc. Resources within a grid are managed using a grid engine, also referred to as "griddleware," that manages submission and acceptance of grid jobs, as well as authentication between resources.

In the depicted example, network data processing system 100 is the Internet with a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with an exemplary embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram of a data processing system is shown in which exemplary aspects of the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as WINDOWS XP operating system, which is available from Microsoft Corporation. An object oriented programming system such as JAVA programming language may run in conjunction with the operating system and provides calls to the operating system from Java programs or applications executing on data processing system 300. "JAVA" is a trademark of Sun Microsystems, Inc. Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system. Data processing system 300 also may be a tablet computer or laptop computer in addition to taking the form of a PDA.

Figure 4:
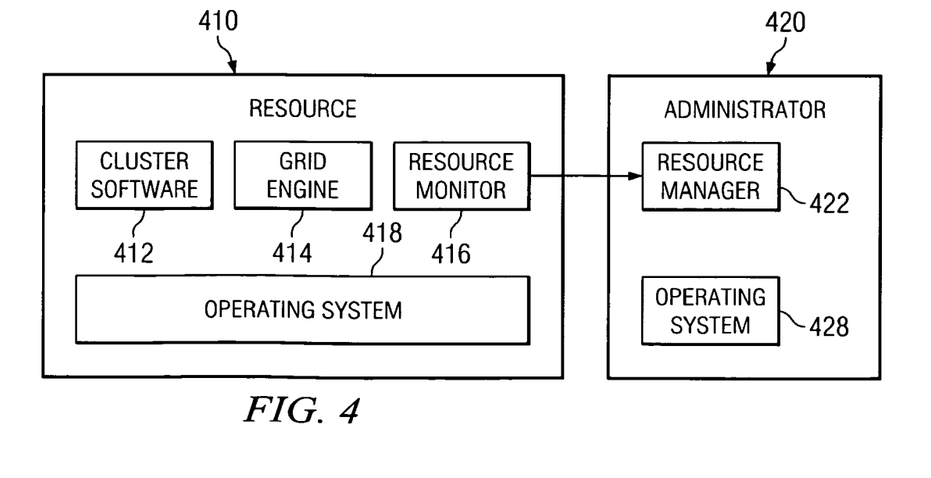
FIG. 4 is a block diagram of a resource monitoring configuration in accordance with an exemplary embodiment of the present invention.

FIG. 4 is a block diagram of a resource monitoring configuration in accordance with an exemplary embodiment of the present invention. Resource 410 includes cluster software 412, grid engine 414, and operating system 418. Resource 410 may be a server, such as one of servers 112 in FIG. 1, for example without limitation. Resource monitor 416 is deployed to resource 410 by an administrator at administrator computer 420.

Administrator computer 420 includes resource manager 422 and operating system 428. Resource manager 422 communicates with monitor 416 and receives and manages monitor information from resource monitors within a network, such as network data processing system 100 in FIG. 1. Administrator computer 420 may be a client, such as client 104 in FIG. 1, for example without limitation.

In accordance with an exemplary embodiment of the present invention, resource monitor 416 scans for information that indicates that the resource under monitoring is part of a cluster, grid, or other composite configuration. Resource monitor 416 may scan for particular files loaded for cluster software 412 or grid engine 414, hooks being leveraged in operating system 418, and processes running for cluster software 412 or grid engine 414.

The resource monitor then determines whether monitoring information for the resource should be reported differently because of the composite configuration. Resource monitor 416 and/or resource manager 422 may keep a table or mapping that indicates which resources belong to which cluster, which resources belong to which grids, and/or which clusters belong to which grids. When monitor information is to be returned to resource manager 422, resource monitor 416 may perform a lookup for the resource to determine whether the monitoring information should be reported differently. Example lookup data structures are described below with respect to FIG. 5.

If monitoring information for the resource is to be reported differently, resource monitor 416 aggregates the monitoring information and alters the reporting format to reflect the composite resource model. Resource manager 422 may then receive the monitoring information and apply this information to individual resources and composite resources.

Figure 5:
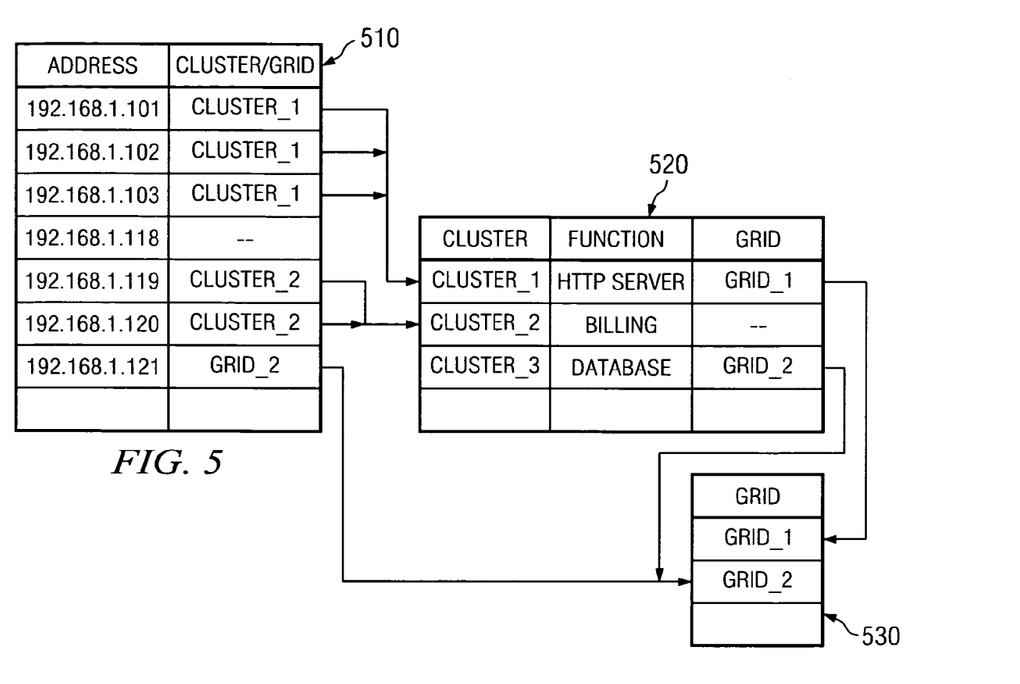
FIG. 5 illustrates example lookup data structures for a composite resource model in accordance with an exemplary embodiment of the present invention.

FIG. 5 illustrates example lookup data structures for a composite resource model in accordance with an exemplary embodiment of the present invention. Resource table 510 associates resources with composite configurations. Resources are identified in the depicted example using an address, such as an Internet Protocol (IP) address. Other identification conventions may also be used depending upon the specific implementation. For example, resources may be identified by a naming convention.

In the example shown in FIG. 5, resource table 510 includes an "Address" column and a "Cluster/Grid" column. The "Cluster/Grid" column identifies whether a resource belongs to a cluster or grid and includes an identification of the cluster or grid to which the resource belongs. For example, as shown in the specific example in FIG. 5, the resource at address 192.168.1.101 belongs to the cluster, Cluster_1, while the resource at address 192.168.1.119 belongs to the cluster, Cluster_2. In this example, the resource at address 192.168.1.118 does not belong to any cluster or grid; however, the resource at address 192.168.1.121 belongs to the grid, Grid_2.

Cluster table 520 associates clusters with the functions they are assigned. In the example shown in FIG. 5, cluster table 520 includes a "Cluster" column and a "Function" column. In the depicted example, the "Cluster" column identifies the cluster by name; however, other identification conventions may be used depending upon the specific implementation. The "Function" column identifies a function or role that is assigned to the cluster of resources. For example, Cluster_1 is assigned a role of "HTTP Server," while Cluster_2 is assigned a role of "Billing" and Cluster_3 is assigned a role of "Database."

Cluster table 520 may also include a "Grid" column. The "Grid" column identifies whether a cluster belongs to a grid and includes an identification of the grid to which the cluster belongs. For example, as shown in the specific example in FIG. 5, Cluster_1 belongs to the grid, Grid_1, while Cluster_3 belongs to the grid, Grid_2. A value in the "Cluster/Grid" column in resource table 510 may point to an entry in cluster table 520 or grid table 530. Similarly, a value in the "Grid" column in cluster table 520 may point to an entry in grid table 530. In this example, grid table 530 simply provides a list of grid names; however, grid table 530 may include additional information within the scope of the present invention.

Figure 6:
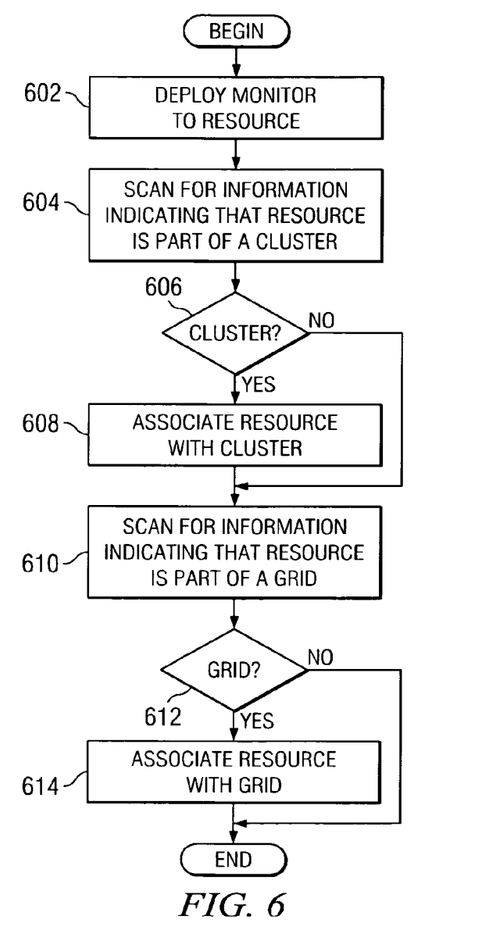
FIG. 6 is a flowchart illustrating the operation of resource monitor deployment in a network environment with composite resources in accordance with an exemplary embodiment of the present invention.

FIG. 6 is a flowchart illustrating the operation of resource monitor deployment in a network environment with composite resources in accordance with an exemplary embodiment of the present invention. The process begins and deploys a monitor to a resource (block 602). Then, the process scans for information indicating that the resource is part of a cluster (block 604). A determination is made as to whether the resource is part of a cluster (block 606).

If the resource is part of a cluster, the process associates the resource with the cluster (block 608). The association may be made, for example, by making an entry in a resource table. Thereafter, the process scans for information indicating that the resource is part of a grid (block 610). If the resource is not part of a cluster in block 606, the process continues directly to block 610 to scan for information indicating that the resource is part of a grid.

A determination is made as to whether the resource is part of a grid (block 612). If the resource is part of a grid, the process associates the resource with the grid (block 614). The association may be made, for example, by making an entry in a resource table. Thereafter, the process ends. If the resource is not part of a grid in block 612, the process ends.

Figure 7:
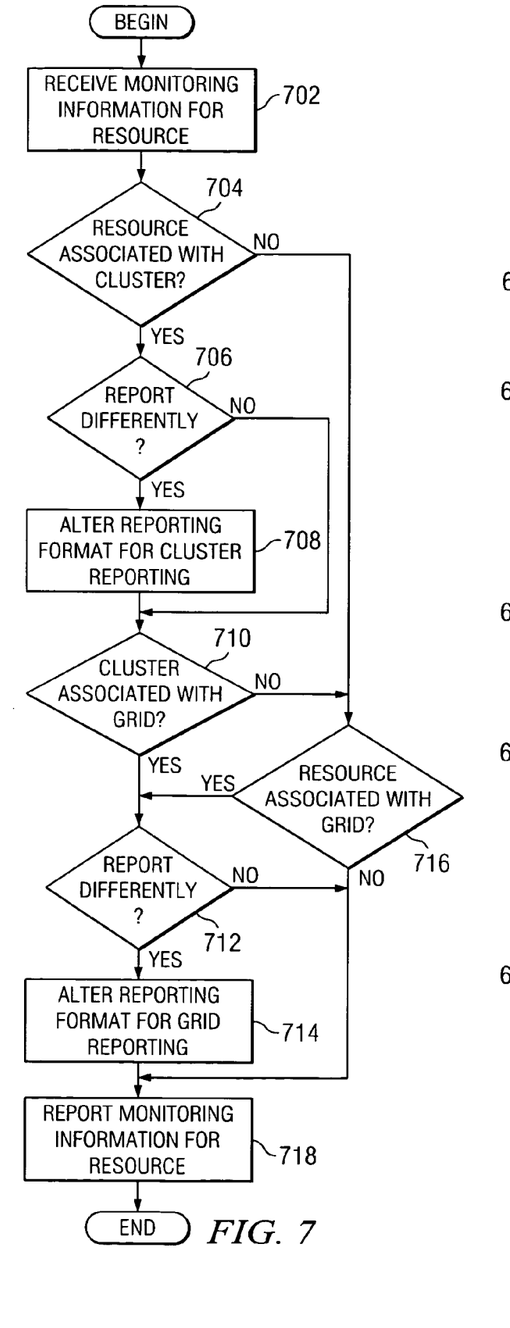
FIG. 7 is a flowchart illustrating the operation of a resource monitor in accordance with an exemplary embodiment of the present invention.

FIG. 7 is a flowchart illustrating the operation of a resource monitor in accordance with an exemplary embodiment of the present invention. The process begins and receives monitoring information for a resource (block 702). This step may be performed by the resource monitor at the resource. A determination is made as to whether the resource is associated with a cluster (block 704). The resource monitor may compile a resource table or receive a resource table from a resource manager. The resource table may map resources to clusters and/or grids within a network environment.

If the resource is associated with a cluster, a determination is made as to whether the monitoring information is to be reported differently for the cluster (block 706). If the monitoring information is to be reported differently, the process alters the reporting format for cluster reporting (block 708). Thereafter, a determination is made as to whether the cluster is associated with a grid (block 710). If the monitoring information is not to be reported differently in block 706, the process continues directly to bock 710 to determine whether the cluster is associated with a grid.

If the cluster is associated with a grid, a determination is made as to whether the monitoring information is to be reported differently for the grid (block 712). If the monitoring information is to be reported differently, the process alters the reporting format for grid reporting (block 714). Thereafter, the process reports the monitoring information for the resource (block 718) and ends. If the monitoring information is not to be reported differently in block 712, the process continues directly to bock 718 to report the monitoring information.

If the cluster is not associated with a grid in block 710 or if the resource is not associated with a cluster in block 704, a determination is made as to whether the resource is associated with a grid (block 716). If the resource is associated with a grid, the process continues to block 712 to determine whether the monitoring information is to be reported differently for the grid (block 712). If the resource is not associated with a grid in block 716, the process continues directly to block 718 to report the monitoring information for the resource. Thereafter, the process ends.

Figure 8:
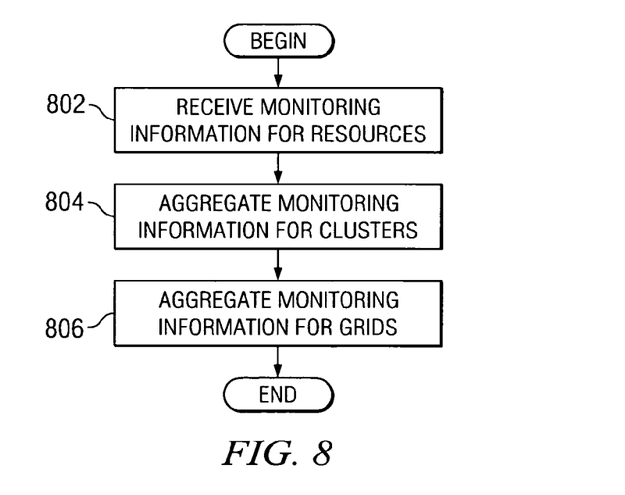
FIG. 8 is a flowchart illustrating the operation of a resource management in accordance with an exemplary embodiment of the present invention.

FIG. 8 is a flowchart illustrating the operation of a resource management in accordance with an exemplary embodiment of the present invention. The process begins and receives monitoring information for a resource (block 802). This step may be performed by the resource manager at an administrator computer or workstation. Then, the process aggregates monitoring information, such as metrics, for example, for clusters (block 804). Next, the process aggregates monitoring information for grids (block 806). Thereafter, the process ends.

Thus, the exemplary aspects of the present invention provide a mechanism and model for representing and managing composite resource models. The resource monitor determines whether monitoring information for the resource should be reported differently because of the composite configuration. If monitoring information for the resource is to be reported differently, the resource monitor alters the reporting format to reflect the composite resource model. The resource manager may then receive the monitoring information and apply this information to individual resources and aggregate monitoring information for composite resources. The resource manager may then make resource management decisions based upon this aggregated monitoring information.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for monitoring a resource to determine whether the resource is in a proper operational state, wherein the resource is a monitored resource, the method comprising:

determining whether the monitored resource is part of a composite resource;

associating the monitored resource with the composite resource, wherein associating the monitored resource with the composite resource includes linking an entry in a resource data structure with an entry in a composite resource data structure;

altering a reporting format for monitoring information to report monitoring information for the monitored resource and for the composite resource, wherein the monitoring information includes an operational status of the resource, and wherein the composite resource is a cluster, wherein the cluster is a plurality of server data processing systems aggregated together in a computing cooperative fashion such that at least some data resources of the plurality of server data processing systems are usable by another of the plurality of server data processing systems;

determining whether the cluster is part of a grid; and associating the cluster with the grid, wherein the grid is a plurality of client and server data processing systems that operate to provide a plurality of computing resources for a common task to be performed by the grid.

2. The method of claim 1, further comprising:

receiving the monitoring information at a resource manager; and aggregating the monitoring information for the composite resource.

3. The method of claim 1, wherein associating the monitored resource with the composite resource includes creating an entry for the monitored resource in the resource data structure.

4. The method of claim 3, wherein the resource data structure is a resource table.

5. The method of claim 3, wherein associating the monitored resource with the resource further includes linking the entry in the resource data structure with an entry in the composite resource data structure.

6. The method of claim 5, wherein the composite resource data structure is a cluster data structure.

7. The method of claim 1, wherein associating the cluster with the grid includes linking the entry in the cluster data structure with an entry in a grid data structure.

8. The method of claim 1, wherein determining whether the monitored resource is part of a composite resource includes identifying at least one of files loaded for a composite resource, hooks being leveraged in an operating system of the resource, and processes running for a composite resource.

9. An apparatus including a data processor for monitoring a resource to determine whether the resource is in a proper operational state, wherein the resource is a monitored resource, the apparatus comprising:

determination means for determining whether the monitored resource is pan of a composite resource;

association means for associating the monitored resource with the composite resource, wherein the association means for associating the monitored resource with the composite resource includes linking means for linking an entry in a resource data structure with an entry in a composite resource data structure;

alteration means for altering a reporting format for monitoring information to report monitoring information for the monitored resource and for the composite resource, wherein the monitoring information includes an operational status of the resource, and wherein the composite resource is a grid, wherein the grid is a plurality of client and server data processing systems that operate to provide a plurality of computing resources for a common task to be performed by the grid;

determining means for determining whether the cluster is pan of a grid; and second association means for associating the cluster with the grid, wherein the grid is a plurality of client and server data processing systems that operate to provide a plurality of computing resources for a common task to be performed by the grid.

10. The apparatus of claim 9, further comprising:

means for receiving the monitoring information at a resource manager; and means for aggregating the monitoring information for the composite resource.

11. The apparatus of claim 9, wherein the association means includes means for creating an entry for the monitored resource in the resource data structure.

12. The apparatus of claim 11, wherein the resource data structure is a resource table.

13. The apparatus of claim 9, wherein the determination means includes means for identifying at least one of files loaded for a composite resource, hooks being leveraged in an operating system of the resource, and processes running for a composite resource.

14. A computer program product, stored on a computer recordable medium, for monitoring a resource to determine whether the resource is in a proper operational state, wherein the resource is a monitored resource, the computer program product comprising:

instructions for determining whether the monitored resource is part of a composite resource;

instructions for associating the monitored resource with the composite resource, wherein the instructions for associating the monitored resource with the composite resource includes instructions for linking an entry in a resource data structure with an entry in a composite resource data structure;

instructions for altering a reporting format for monitoring information to report monitoring information for the monitored resource and for the composite resource, wherein the monitoring information includes an operational status of the resource, and wherein the composite resource is one of a cluster and a grid, wherein the cluster is a plurality of server data processing systems aggregated together in a computing cooperative fashion such that at least some data resources of the plurality of server data processing systems are usable by another of the plurality of server data processing systems, and wherein the grid is a plurality of client and server data processing systems that operate to provide a plurality of computing resources for a common task to be performed by the grid;

instructions for determining whether the cluster is part of a grid; and instructions for associating the cluster with the grid, wherein the grid is a plurality of client and server data processing systems that operate to provide a plurality of computing resources for a common task to be performed by the grid.

15. The computer program product of claim 14, further comprising:

instructions for receiving the monitoring information at a resource manager; and instructions for aggregating the monitoring information for the composite resource.

* * * * *